United States Patent [19]

Maiocco et al.

[11] Patent Number: 4,466,262
[45] Date of Patent: Aug. 21, 1984

[54] STEERING LOCK

[75] Inventors: Giuseppe A. Maiocco, Rivoli; Pietro Frascarolo, Druento, both of Italy

[73] Assignee: Champion Spark Plug Italiana S.p.A., Druento, Italy

[21] Appl. No.: 461,989

[22] Filed: Jan. 28, 1983

[51] Int. Cl.³ .............................................. B60R 25/02
[52] U.S. Cl. ...................................... 70/252; 70/186
[58] Field of Search .................................. 70/186, 252

[56] References Cited

U.S. PATENT DOCUMENTS

| | | | |
|---|---|---|---|
| 2,063,088 | 12/1936 | FitzGerald | 70/127 |
| 3,527,071 | 9/1970 | Warnod | 70/252 |
| 3,566,635 | 3/1971 | Wolter | 70/252 |
| 3,708,032 | 1/1973 | Suzuki | 180/114 |
| 3,748,877 | 7/1973 | Wolter | 70/186 |
| 3,840,714 | 10/1974 | Arman | 200/44 |
| 3,859,828 | 1/1975 | Ibuka et al. | 70/252 |
| 3,959,996 | 6/1976 | Thirion | 70/186 |
| 4,328,688 | 5/1982 | Maiocco | 70/252 |
| 4,400,954 | 8/1983 | Nakamoto et al. | 70/186 |
| 4,425,770 | 1/1984 | Mentani et al. | 70/186 X |
| 4,427,967 | 1/1984 | Maiocco | 70/252 X |

FOREIGN PATENT DOCUMENTS

| | | | |
|---|---|---|---|
| 923322 | 3/1973 | Canada | 70/252 |
| 1800882 | 7/1970 | Fed. Rep. of Germany | 70/252 |
| 2047702 | 3/1972 | Fed. Rep. of Germany | 70/252 |

Primary Examiner—Gary L. Smith
Assistant Examiner—Thomas J. Dubnicka
Attorney, Agent, or Firm—John C. Purdue

[57] ABSTRACT

An improved steering lock is disclosed. It is of the type comprising a rotatable lock cylinder, a latch operable in a first position and inoperable in a second position to engage a recess in a steering shaft of an associated motor vehicle, and a rocking lever operable in a first position and inoperable in a second position to maintain the latch in its second position. During rotation of the lock cylinder in one direction, the latch is caused to move from its first position towards its second position. When the latch reaches its second position, a projection on the rocking lever engages a recess in the latch whereby it is maintained in its second position and the steering shaft is maintained in an unlocked condition. The steering lock includes means mounting the rocking lever for rotation in two different planes. The rocking lever is mounted for rotation in a first plane about an axle and, in a second plane, about one of its ends. The latch causes rotation of the rocking lever in the second plane in one direction as it moves towards its second position, while a spring causes rotation thereof in the other direction when the latch reaches its second position. As a result of the rotation caused by the spring, the projection on the rocking lever is caused to engage the recess in the latch.

7 Claims, 14 Drawing Figures

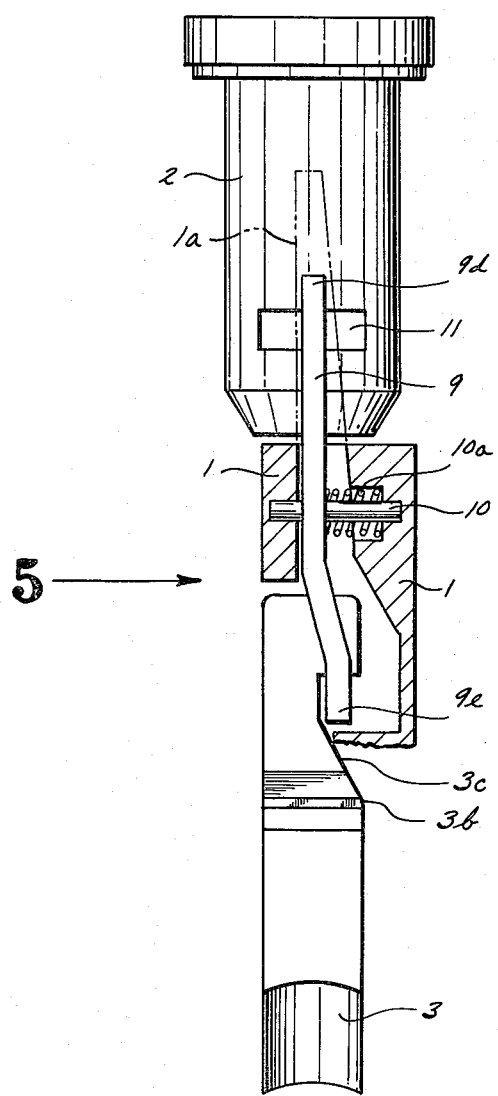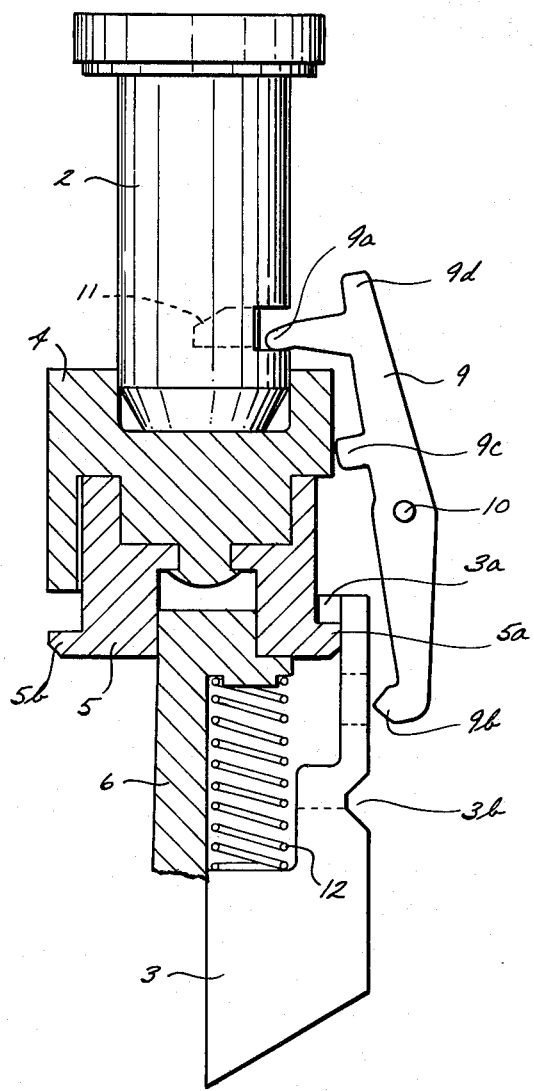
FIG. 3   FIG. 5
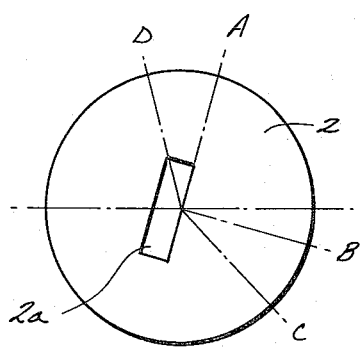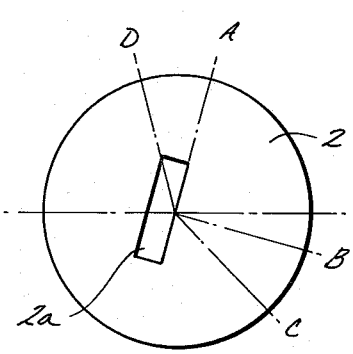
FIG. 4   FIG. 6

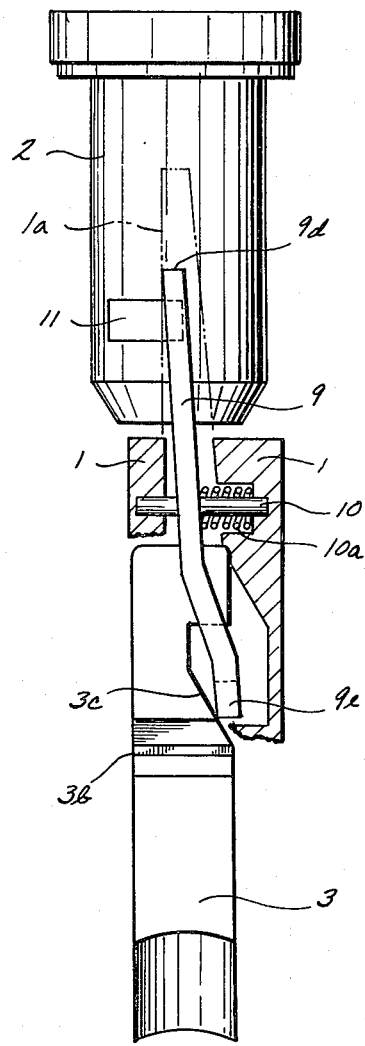
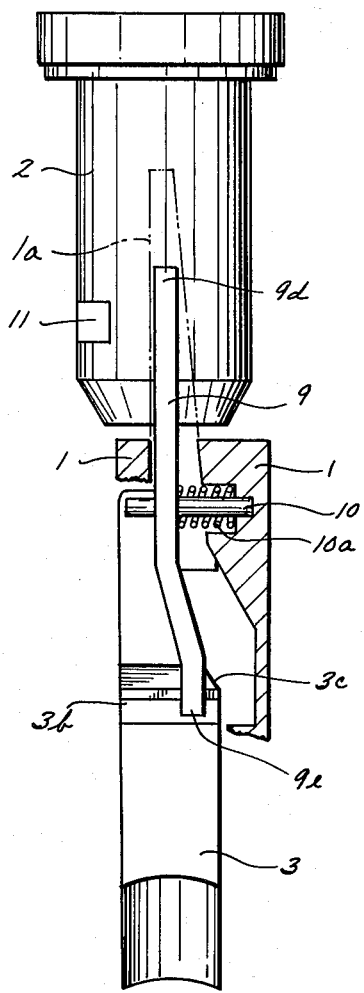
FIG. 7  FIG. 9
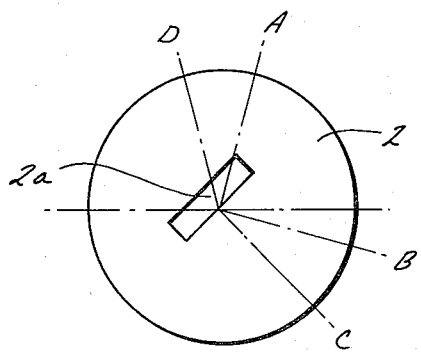
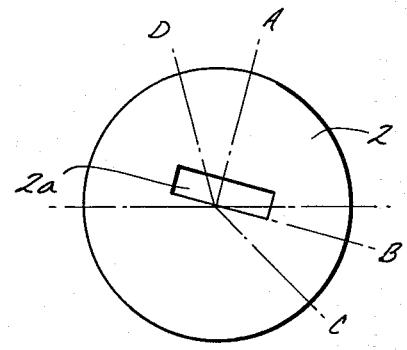
FIG. 8  FIG. 10

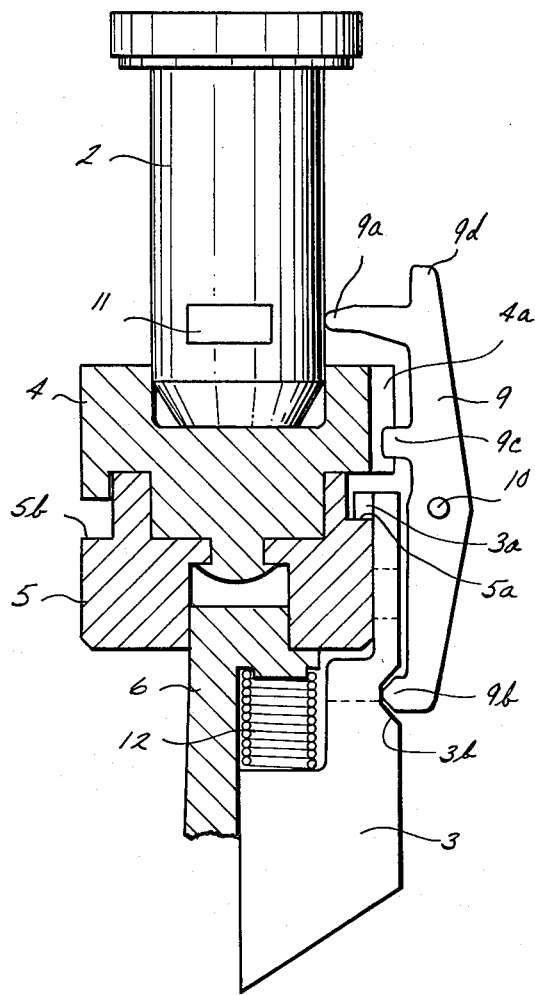
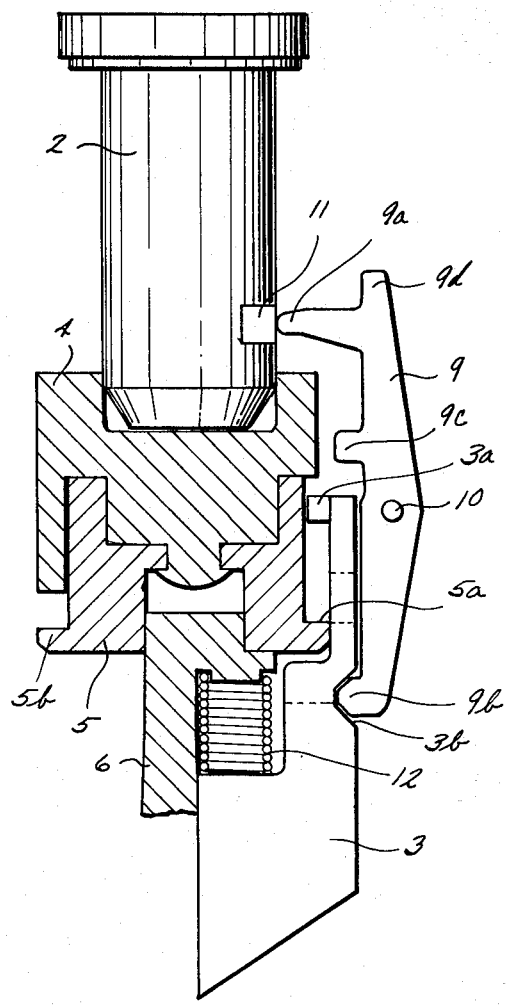
FIG. 11          FIG. 13
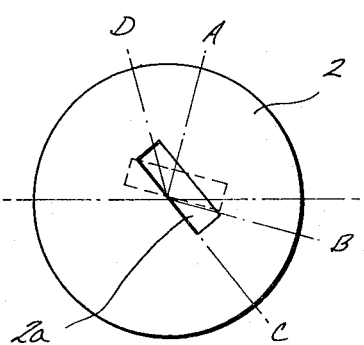
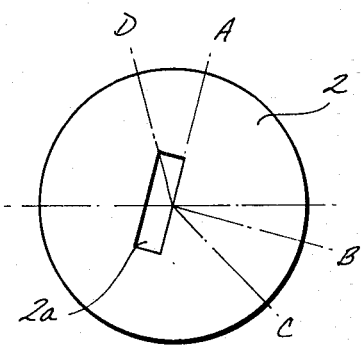
FIG. 12          FIG. 14

STEERING LOCK

BACKGROUND OF THE INVENTION

1. Field of the Invention

The present invention relates to a steering lock for locking a steering shaft of an associated motor vehicle. The lock is generally of the type comprising a rotatable lock cylinder, a latch operable in one position and inoperable in a second position to engage a recess in the steering shaft of the vehicle and a rocking lever operable in one position and inoperable in a second position to maintain the latch in its second position.

2. Description of the Prior Art

Steering locks of the general type described above are known in the prior art, being shown, for example, in British Pat. No. 1,263,362, British Patent Application No. 2,042,621 and German (Federal Republic) Patent Application No. 1,800,882. Each of these references discloses a steering lock including a rotatable lock cylinder, a rocking lever and means mounting the rocking lever for rotation and sliding movement in a plane which intersects the axis of rotation of the lock cylinder.

SUMMARY OF THE INVENTION

The instant invention is based upon the discovery of an improvement in a steering lock of the type comprising a rotatable lock cylinder, a latch operable in a first position and inoperable in a second position to engage a recess in a steering shaft of an associated motor vehicle, and a rocking lever operable in a first position and inoperable in a second position to maintain the latch in its second position. During rotation of the lock cylinder in one direction, the latch is caused to move from its first position towards its second position. When the latch reaches its second position, a projection on the rocking lever engages a recess in the latch whereby it is maintained in its second position and the steering shaft is maintained in an unlocked condition.

According to the improvement of the instant invention, the steering lock includes means mounting the rocking lever for rotation in two different planes. The rocking lever is mounted for rotation in a first plane about an axle and, in a second plane, about one of its ends. The latch causes rotation of the rocking lever in the second plane in one direction as it moves towards its second position, while a spring causes rotation thereof in the other direction when the latch reaches its second position. As a result of the rotation caused by the spring, the projection on the rocking lever is caused to engage the recess in the latch.

According to a further improvement of the instant invention, a part which rotates with the lock cylinder is provided with a radially extending wall. In a manner more fully described below, the wall supplements the spring to ensure rotation of the rocking lever and the consequential engagement between the projection of the rocking lever and the recess of the latch when it is in its second position.

Accordingly, it is an object of the instant invention to provide an improved steering lock.

It is a further object to provide a steering lock wherein the latch is maintained, at all appropriate times, in a position where it does not engage the steering shaft.

Other objects and advantages of the invention will be apparent from the description which follows, reference being made to the accompanying drawings.

BRIEF DESCRIPTION OF THE DRAWINGS

FIG. 3 is a partial side view of the steering lock as viewed from the direction of an arrow 3 of FIG. 1.

FIG. 4 is a view of the top of the steering lock showing the lock cylinder in the first position when the cylinder is in this position, insertion of a key in the lock cylinder moves the latch and the rocking lever to the positions shown in FIG. 1.

FIG. 5 is a view similar to FIG. 1, showing the lock cylinder in its first position, the latch in its first position, and the locking lever in a position to which it is forced when a key is removed from the associated lock cylinder.

FIG. 6 is a view of the top of the steering lock showing the lock cylinder in the first position when the cylinder is in this position, removal of the key from the lock cylinder causes the rocking lever to move to the position shown in FIG. 5.

FIG. 7 is a view similar to FIG. 3, showing the lock cylinder in a position intermediate between the first position and a second position, the latch in a corresponding intermediate position, and the rocking lever in a position to which it is forced when the latch is moved to the intermediate position.

FIG. 8 is a view of the top of the steering lock showing the lock cylinder in an intermediate position. Rotation of the lock cylinder to the intermediate position of FIG. 8 moves the latch and the rocking lever to the intermediate positions shown in FIG. 7.

FIG. 9 is a view similar to FIG. 3 showing the lock cylinder in the second position, the latch in a corresponding second position, and the rocking lever in a position to which it is forced when the latch and the locking cylinder are moved to their second positions from their first positions.

FIG. 10 is a view of the top of the steering lock showing the lock cylinder in the second position. Rotation of the lock cylinder to the position of FIG. 10 moves the latch to the position of FIG. 9, whereupon a spring moves the rocking lever to the position shown in FIG. 9.

FIG. 11 is a view similar to FIG. 1 showing the lock cylinder in a third position, the latch in the second position, and the rocking lever in a position to which it is forced when the latch and the locking cylinder are moved to their second positions.

FIG. 12 is a view of the top of the steering lock showing the lock cylinder in the third position. Rotation of the lock cylinder from its second position to its third position does not effect a corresponding change in the positions of the latch and the rocking lever.

FIG. 13 is a view similar to FIG. 1 showing the lock cylinder in the first position, the latch in the second position, and the rocking lever in a position to which it is forced when the latch and the locking cylinder are moved from their first positions to their second positions.

FIG. 14 is a view of the top of the steering lock showing the lock cylinder in the first position. Rotation of the lock cylinder form the first position to a fourth position, which is indicated by dotted lines, does not effect a corresponding change in the positions of the latch and the rocking lever.

Figure 1:
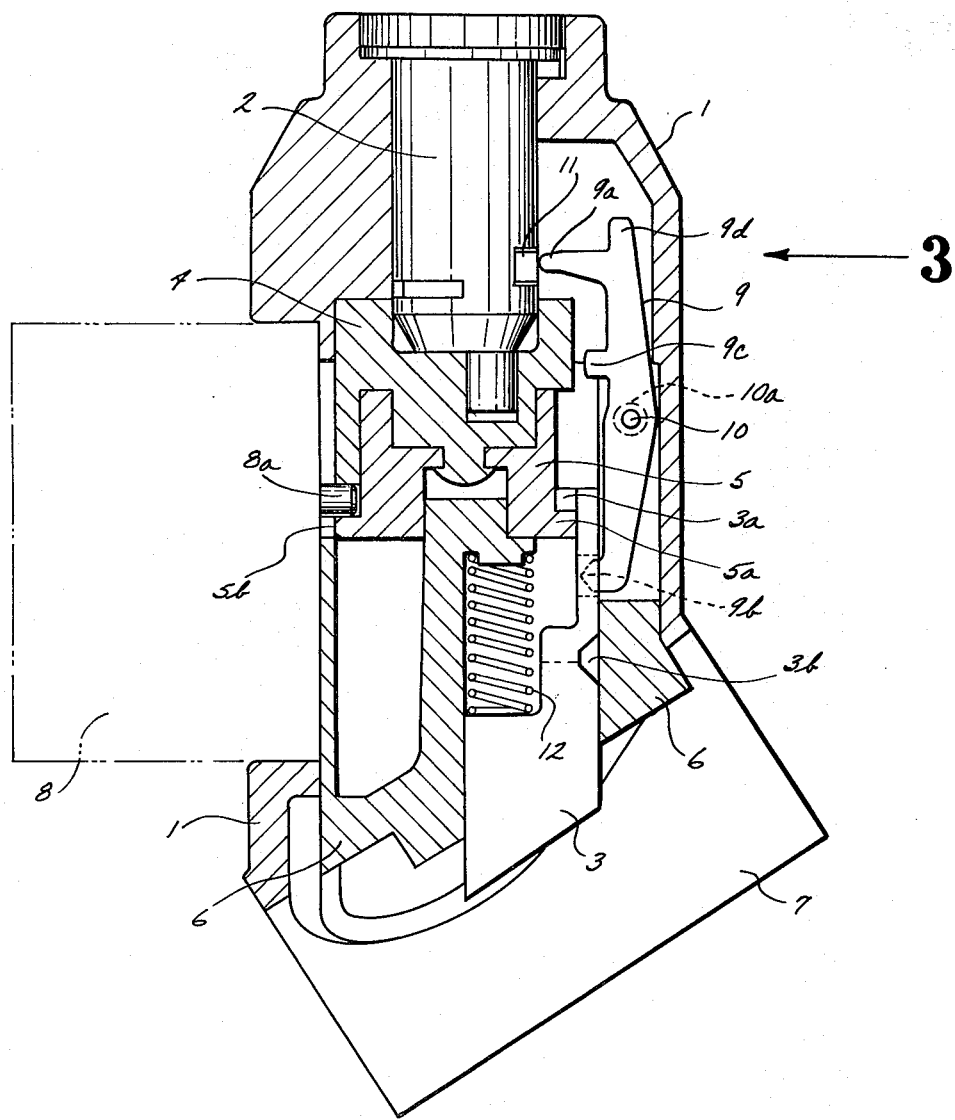
FIG. 1 is a view in longitudinal cross-section of a steering lock according to the instant invention showing a lock cylinder in a first position, a latch in a corresponding first position, and a rocking lever in a position to which it is forced when a key is inserted in an associated lock cylinder.
Figure 2:
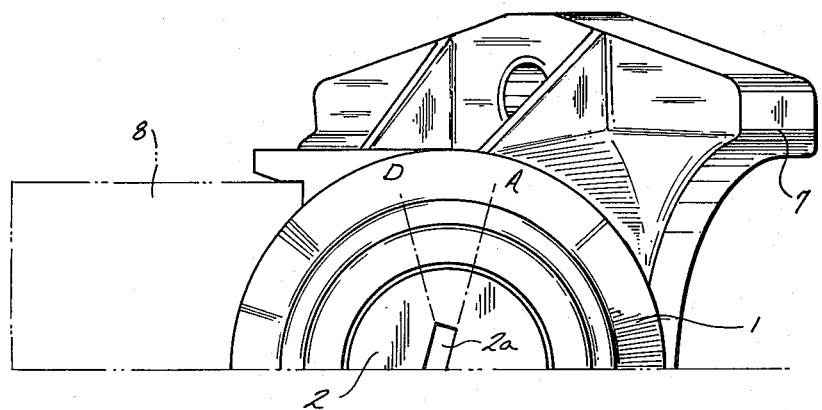
FIG. 2 is a partial view of the top of the steering lock of FIG. 1.

A steering lock according to the improvement of the invention, as shown in FIGS. 1–3, comprises an exterior housing 1, a key-actuated rotatable lock cylinder 2 with a key-slot 2-a (FIG. 2), a latch 3, rotatable parts 4 and 5 which are integral with the rotatable lock cylinder 2, a stationary part 6 and a collar 7 for attaching the steering lock to a steering column (not shown) of a vehicle (not shown). The steering lock as shown in FIGS. 1, 2 and 3, includes an electrical switch 8 with a detent 8-a. The switch 8 is actuated during rotation of the lock cylinder 2 by a cam 5-b which acts on the detent 8-a; the switch 8 may control various circuits in the electrical system of the vehicle. The steering lock further comprises a rocking lever 9 which is mounted for rotation about an axle 10, a spring 10-a (FIG. 3) which is mounted about the axle 10, a sliding cam 11 which is mounted in a radially extending slot in the lock cylinder 2 for sliding movement therein and a spring 12 mounted between the stationary part 6 and the latch 3.

The embodiment of the steering lock of the invention shown in the drawings has four operating positions which correspond with four angular positions of the key-slot 2-a, and of an ignition key (not shown) therein. In FIGS. 4, 6, 8, 10, 12 and 14, A, B, C and D indicate angular positions of the key-slot 2-a corresponding, respectively, with the "stop", "running", "starting" and "parking" positions of the ignition key in the steering lock. The operation of the preferred embodiment of the improved steering lock will be described now with reference to FIGS. 1, 3, 5, 7, 9, 11 and 13, the corresponding angular positions of the key-slot 2-a being shown in FIGS. 2, 4, 6, 8, 10, 12 and 14, respectively.

When the ignition key has been turned to the stop position A and withdrawn from the key-slot 2-a (FIG. 5), the latch 3 is in its first position wherein it is operable to engage a steering shaft recess (not shown). A projection 9-a on the rocking lever 9 extends into a radial slot in the rotatable lock cylinder 2. When the ignition key (not shown) is inserted in the key-slot 2-a (FIG. 1), the sliding cam 11 and the projection 9-a are caused to move radially outwardly in the slot in the lock cylinder 2. Accordingly, the rocking lever 9 pivots about the axle 10, in a plane which intersects the axis of rotation of the lock cylinder 2. As the ignition key is turned from the stop position A toward the starting position C, a helical cam 5-a acts on a detent 3-a causing the latch 3 to move upwardly from its first position (FIG. 1) towards its second position (FIG. 11). During this movement of the latch 3, an inclined surface 3-c thereof urges an end 9-e of the lever 9 (FIGS. 3, 7 and 9) to the right, causing the lever 9 to rotate about its end 9-d which rests against a radial wall 1-a of the housing 1. It will be noted that this rotation is in a plane which does not intersect the axis of rotation of the lock cylinder 2. As shown in FIG. 7, during this rotation, the spring 10-a is compressed by the rocking lever 9. There is limited clearance between the rocking lever 9 and the axle 10 to accommodate this rotation.

When the ignition key reaches its "running" position (FIGS. 9 and 10), the latch 3 reaches its second position.

At this point, a recess 3-b in the latch 3 is adjacent a stop 9-b (FIGS. 1, 5, 11 and 13) of the rocking lever 9; as a consequence, the spring 10-a forces the end 9e of the latter to the left (FIG. 9), moving the stop 9-b into the recess 3-b, so that the rocking lever 9 prevents the latch 3 from moving downwardly from its second position acting against the spring 12.

When the ignition key is turned from the "running" position B (FIG. 9) towards either the "stop" position A (FIG. 3) or the "starting" position C (FIG. 11), the relative positions of the latch 3 and the rocking lever 9 remain the same; the lock cylinder 2 rotates and the projection 9-a slides on the exterior of the lock cylinder 2 and the sliding plate 11.

When the ignition key is turned to the "stop" position A (FIG. 1) and is withdrawn from the key-slot 2-a, the rocking lever 9 rotates about the axle 10 and the projection 9-a moves the sliding cam 11 radially inwardly of the lock cylinder 2 (FIG. 5). The rotation of the rocking lever 9 is caused by the spring 12, acting on the latch 3, and transmits through a wall adjacent the recess 3-b and a portion of the stop 9-b. When the rocking lever 9 rotates to its first position (FIG. 5), the stop 9-b is moved out of the recess 3-b whereupon the spring 12 moves the latch 3 to its first position.

As shown in FIG. 11, the rotating part 4 has a radially extending wall 4-a which is positioned so that it contacts the projection 9-c of the rocking lever 9 when the stop 9-b is engaged in the recess 3-b. If the locking cylinder 2 is rotated from the running position B towards the starting position C, the wall 4-a, acting on the projection 9-C, causes the rocking lever 9 to rotate from the position shown in FIG. 7 to the position shown in FIG. 9. Thus, the wall 4-a compliments the spring 10-a to ensure that the rocking lever 9 will rotate and that the projection 9-b will engage the recess 3-b to maintain the latch 3 in its second position wherein the steering shaft is unlocked when the associated vehicle is started.

Although a preferred embodiment has been described, it is to be understood that the scope of the invention is not limited thereto or thereby. It will be apparent that various changes and modifications can be made from the specific details of the invention as disclosed herein without departing from the spirit and scope thereof as defined in the following claims.

We claim:

1. A steering lock comprising a lock cylinder, a latch movable between a first position in which it is operable and a second position in which it is inoperable to engage a recess in a steering shaft of an associated motor vehicle, an exterior housing, means operable to move said latch from its first position to its second position, a rocking lever, means mounting said rocking lever for rotation in a plane which is axial of the steering lock between a first position in which it is operable and a second position in which it is inoperable to lock said latch in its second position, and for rotation in a second plane which is not axial of the steering lock, and means operable to cause rotation of said rocking lever in the second plane.

2. A steering lock as claimed in claim 1 wherein said means operable to cause rotation of said rocking lever in the second plane comprises a spring which is operable to cause the rotation in one direction, and wherein said latch is operable, as it moves from its second position to its first position, to cause rotation in the opposite direction.

3. A steering lock as claimed in claim 2 wherein said rocking lever, during rotation in the second plane, pivots about an extremity thereof, which rests against a wall of said exterior housing.

4. A steering lock as claimed in claim 3 wherein said latch has an inclined surface which causes said rocking lever to rotate in the second plane as said latch moves from its first position to its second position.

5. A steering lock as claimed in claim 4 wherein there is a stop at one end of said lever, and said latch has a corresponding recess, and wherein said latch and said lever are so mounted that, when said latch is in its second position, said spring is operable to cause said lever to rotate in the second plane to cause said stop to engage the recess in said latch.

6. A steering lock as claimed in claim 5 wherein said lock cylinder is rotatable, key-actuated, and includes a sliding cam mounted for radial sliding movement in a groove therein and wherein, when a key is inserted into the lock cylinder, said sliding cam is caused to slide radially outwardly and is operable to cause rotation of said lever in the plane which is axial of the steering lock.

7. A steering lock as claimed in claim 6 which further comprises a part which rotates with said lock cylinder and has a radially extending wall which is operable, during rotation of said lock cylinder, to cause rotation of said rocking lever in the second plane to a position where said stop thereof engages the recess of said latch.

* * * * *

UNITED STATES PATENT AND TRADEMARK OFFICE
CERTIFICATE OF CORRECTION

PATENT NO. : 4,466,262
DATED : August 21, 1984
INVENTOR(S) : Giuseppe A. Maiocco et al.

It is certified that error appears in the above-identified patent and that said Letters Patent are hereby corrected as shown below:

On the first page insert:

"Foreign Application Priority Data

Feb. 12, 1982[IT] Italy ................ 67166 A/82";

In Claim 2, line 5, delete "second" and substitute therefor -- first -- ; and

In Claim 2, line 6, delete "first" and substitute therefor -- second -- .

Signed and Sealed this

Fifth Day of February 1985

[SEAL]

Attest:

DONALD J. QUIGG

Attesting Officer    Acting Commissioner of Patents and Trademarks